(12) United States Patent
Chan et al.

(10) Patent No.: US 9,020,892 B2
(45) Date of Patent: Apr. 28, 2015

(54) EFFICIENT METADATA STORAGE

(75) Inventors: Kevin Andrew Chan, Duvall, WA (US); Bruce Wayne Copeland, Redmond, WA (US); Aakash Kambuj, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 13/178,748

(22) Filed: Jul. 8, 2011

(65) Prior Publication Data

US 2013/0013561 A1    Jan. 10, 2013

(51) Int. Cl.
*G06F 17/30* (2006.01)

(52) U.S. Cl.
CPC .............................. *G06F 17/30132* (2013.01)

(58) Field of Classification Search
CPC ....... G06F 3/061; G06F 3/0643; G06F 12/00; G06F 12/0868; G06F 17/30091; G06F 11/1435; G06F 12/122
USPC ................... 707/636, 736, 812, 827; 711/137
See application file for complete search history.

(56) References Cited

U.S. PATENT DOCUMENTS

| | | | |
|---|---|---|---|
| 6,981,102 B2 * | 12/2005 | Beardsley et al. | 711/141 |
| 7,725,431 B2 | 5/2010 | Myllyla et al. | |
| 7,818,541 B2 * | 10/2010 | Rhoades et al. | 712/22 |
| 7,904,480 B2 | 3/2011 | Palanisamy | |
| 8,095,577 B1 * | 1/2012 | Faibish et al. | 707/823 |
| 8,112,603 B2 * | 2/2012 | Dow | 711/165 |
| 2005/0027755 A1 | 2/2005 | Shah et al. | |
| 2006/0090039 A1 * | 4/2006 | Jain et al. | 711/137 |
| 2007/0294589 A1 * | 12/2007 | Jarvis et al. | 714/42 |
| 2008/0250034 A1 | 10/2008 | Petri | |
| 2008/0270462 A1 | 10/2008 | Thomsen | |
| 2008/0317068 A1 * | 12/2008 | Sagar et al. | 370/503 |
| 2009/0234850 A1 | 9/2009 | Kocsis et al. | |
| 2011/0191522 A1 * | 8/2011 | Condict et al. | 711/103 |
| 2011/0314071 A1 * | 12/2011 | Johnson et al. | 707/827 |

OTHER PUBLICATIONS

Verma, et al., "Efficient Metadata Management for Cloud Computing applications", Retrieved at <<https://www.ideals.illinois.edu/bitstream/handle/2142/14820/paper.pdf?sequence=2>>, Jan. 19, 2010, pp. 1-5.
Alter, Yves, Flexible metadata-based partial synchronization for personal mobile devices, Retrieved at <<http://e-collection.ethbib.ethz.ch/eserv/eth:204/eth-204-01.pdf>>, Apr. 2009, pp. 72.
Bin, et al., "A novel metadata management scheme in Cloud Computing", Retrieved at <<http://ieeexplore.ieee.org/xpl/freeabs_all.jsp?arnumber=5608877>>,2nd International Conference on Software Technology & Engineering (ICSTE), Oct. 3, 2010, pp. 6.
"Appendix E—Microsoft Sync Framework and Windows Phone 7", Retrieved at <<http://msdn.microsoft.com/en-us/library/gg507824.aspx>>, Retrieved Date: Mar. 11, 2011, pp. 9.

\* cited by examiner

*Primary Examiner* — Debbie Le
(74) *Attorney, Agent, or Firm* — Bryan Webster; Kate Drakos; Micky Minhas

(57) ABSTRACT

One or more techniques and/or systems are disclosed for efficiently storing metadata of partitioned data (e.g., directed to a specific individual/user). A first subset of data is identified from the set of partitioned data. The first subset of data comprises data that has a high frequency of access, and may be identified, at least in part, by frequency of access metadata that is associated with the data in the set. Metadata, such as discovery information, permissions, version info, etc., that is associated with the data in the first subset can be stored in low latency (e.g., fast) storage, proving more efficient access. Metadata associated with data from the set of partitioned data that is not in the first subset (e.g., that is not accessed frequently) can be stored in higher latency (e.g., slower, less expensive) storage.

20 Claims, 8 Drawing Sheets

EFFICIENT METADATA STORAGE

BACKGROUND

Metadata can be associated with data, such as files, folders, or indexed data, and it may be used to describe the content or the file, for example and/or information about the file itself. Metadata can be created automatically by handler programs and/or manually added by a user. Often, metadata created or captured by a computer may comprise information about when a file was created, who created it, when it was last updated, file size, a file extension, access permissions, discovery processing, and more. Metadata can be stored with the associated data (e.g., attached to the file), or may be stored separately and indexed to the associated file. As an example, a central system that provides synchronization services for a plurality of clients may store metadata for data that is shared between the respective clients. For example, the respective clients may locally store the shared data, and the synchronization service may store at least some of the metadata associated with the shared files.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A synchronization (synch) environment can comprise a central service (e.g., comprising one or more servers for storing and managing the synchronization data/metadata), which may be a cloud-based source through which one or more synch clients discover change information, propagate change information and/or learn about how to communicate with peer synch clients. Typically, in such a synch environment, a majority of underlying metadata is stored indefinitely, which leads to a decision about when to move the metadata from expensive, low latency storage to less expensive high latency storage (e.g., or remove it from the system altogether).

Deciding when to move (e.g., or remove) the metadata can be difficult, because one or more synch clients often drop off the synch service for a long period of time, but may later need the metadata. Further, when adding a new synch client to an existing relationship, the newly added client may need to retrieve the respective existing metadata, which may be difficult if the metadata no longer exists in the cloud. Storing the metadata indefinitely can, however, lead to lower throughput and higher cost expenditures, particularly when the synch data increases in scale, and/or with large scale deployments. For example, merely a small portion of the metadata is typically accessed for a synch service, where the majority of the metadata is "stale," as it typically relates to older versions of the associated data.

Accordingly, one or more techniques and/or systems are disclosed classifying metadata as "cold data," which may be infrequently accessed, or "hot data," which may be more frequently accessed. By classifying the metadata it may be stored in a more cost effective (e.g., less computationally intensive) manner. A service may be used to manage how metadata is stored and how metadata is transitioned between the stores. For example, metadata that is more frequently accessed may be stored in low latency (e.g., but more expensive) storage, and less frequently accessed metadata (e.g., comprising a majority of the metadata) can be stored in higher latency (e.g., and less expensive) storage. Synch clients can remain agnostic to the underlying storage mechanism by using a common abstraction interface, for example.

In one embodiment of efficiently storing metadata of partitioned data, a first subset of data comprising data that has a high frequency of access is identified from a set comprising partitioned data. The first subset is identified based at least in part upon metadata associated with the data in the set. Further, metadata associated with the data in the first subset can be stored in low latency storage. Additionally, metadata associated with data from the set of partitioned data that is not in the first subset can be stored in higher latency storage.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
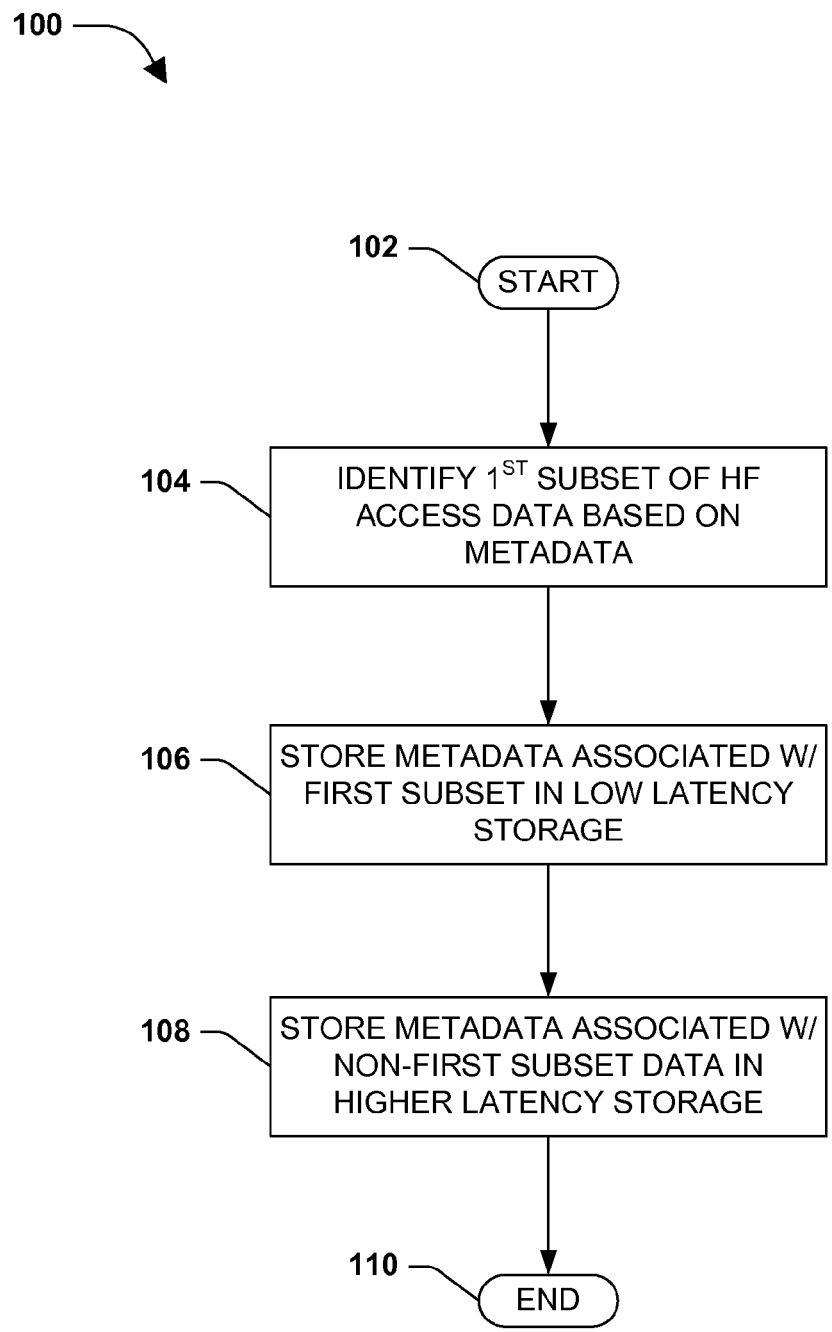
FIG. 1 is a flow diagram illustrating an exemplary method for efficiently storing metadata of partitioned data.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for classifying synchronized metadata, for example, as being "cold data" that is infrequently accessed, or "hot data" that is frequently accessed. If the synchronized metadata can be classified it may be stored in a more efficient and cost effective manner. Further, for example, retrieval of the metadata may be more efficient, particularly if the data was previously identified as "cold data." Additionally, a service may be used that can govern how the data is stored and transitioned between various manners of storage. Requesting clients can remain agnostic to the underlying storage mechanisms using a common abstraction interface, for example.

FIG. 1 is a flow diagram illustrating an exemplary method 100 for efficiently storing metadata of partitioned data. The exemplary method 100 begins at 102 and involves identifying a first subset of data that has a high frequency of access, from a set comprising partitioned data. The identifying of the first subset is based on metadata that is associated with the data in the set. For example, data that is accessed by a user may be partitioned into a set associated with that user, such that the set of partitioned data can be stored in a way that allows for efficient retrieval by the user (e.g., stored on a same server or group of linked servers). In this example, metadata associated with the data in the set can be used to identify how often the data is accessed (e.g., for retrieval, updating, moving, etc.), and data that is frequently accessed can be grouped into the first subset.

In one aspect, data can be synchronized (synched) between a plurality of devices and systems, using a cloud-based service (e.g., comprising storage servers) as an authority for synching data between the devices. In this aspect, for these type of synch systems, where the cloud-based service may be the authority for changes happening within a given synchronization scope (e.g., set of files, folders, blocks of data), metadata management can be important as the system increases in scale, for example.

In this aspect, in one embodiment, synch metadata (e.g., metadata associated with the synchronized data) may be classified into at least two categories. A first category (e.g., the first subset) may comprise metadata that a client of the synch system needs to read when working in the synch system (e.g., discovery information, synch peers, authorization/authentication for data access, etc.); and a second category (e.g., outside of the first subset) can comprise metadata that describes blocks of data that may be transferred between endpoints (e.g., client devices), such as during synchronization.

In this embodiment, for example, the first category of metadata may be accessed frequently by clients in the synch system, for which low latency storage may be preferable (e.g., providing faster access). Further, as an example, the synch clients are typically interested in most recently changed metadata from the second category (e.g., associated with recently changed documents), and may rarely access older metadata from this category, as older versions of the synched data may rarely be accessed. However, conventional synch systems store partitioned metadata in a same type of storage (e.g., all in (expensive) low latency storage) regardless of how often some of the metadata from the set of partitioned data is accessed.

At 106 in the exemplary method 100, metadata that is associated with the data in the first subset is stored in low latency storage. For example, the metadata associated with the data that is frequently accessed by one or more clients of the synch system can be stored in low latency storage (e.g., an indexed database), thereby providing for faster access. In this way, for example, merely a portion of the metadata associated with the set of partitioned data is stored in the low latency storage, which typically comprises a more expensive (e.g., cost and/or computationally expensive) type of storage.

At 108, metadata associated with data from the set of partitioned data that is outside the first subset is stored in higher latency storage. For example, the metadata associated with the data that is less frequently accessed by one or more of the clients in the synch system can be stored in high latency storage (e.g., binary (or basic) large object (blob) storage). As an example, the less frequently accessed metadata typically comprises a larger portion of the metadata associated with the set of partitioned data. In this way, for example, the larger portion of the metadata associated with the set of partitioned data is stored in the high latency storage, which typically comprises a less expensive type of storage.

Figure 2:
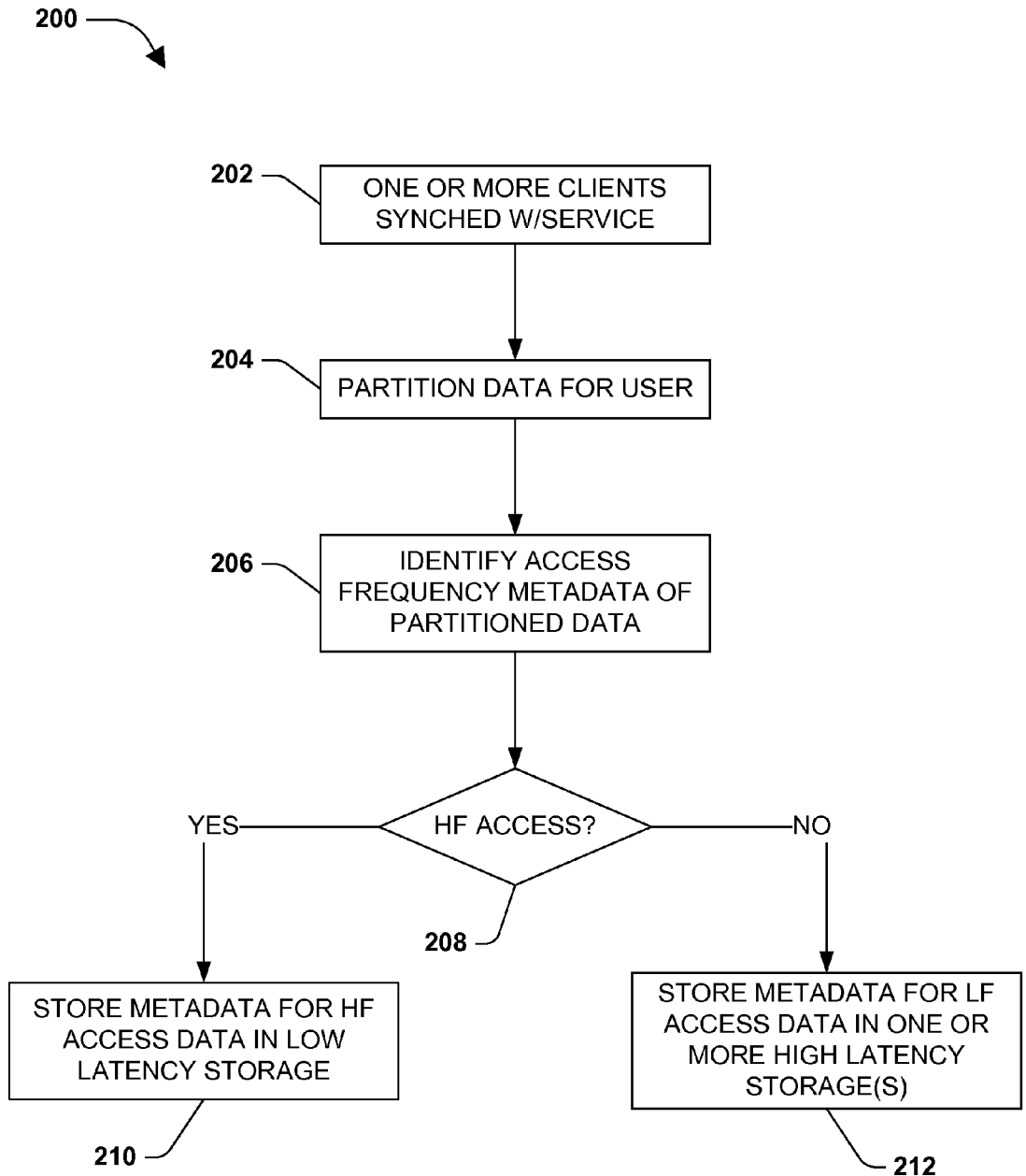
FIG. 2 is a flow diagram illustrating an example embodiment of one or more portions of one or more techniques described herein.

FIG. 2 is a flow diagram illustrating an example embodiment 200 of one or more portions of one or more techniques described herein. At 202, one or more clients (e.g., computers, servers, handheld devices, etc.) are synched with a synchronization service (e.g., a cloud-based synch server system). As described above, for example, a plurality of client devices may share data, such as documents, files, folders, etc., and synch the data with the respective devices synched with the service. In one embodiment, the service can comprise an online, cloud-based service that detects when shared data has been changed by one of the clients, and can provide for synchronization of the change with the other clients (e.g., informing clients of availability of and/or changes to shared data).

At 204, data associated with a user is partitioned (e.g., so that the data (associated with the user) is in some manner separated from other data (e.g., associated with other users)). As an example, a partition may act or look like a separate disk on a computer, with its own identifier (e.g., disk drive). However, a partition can be a subset of an existing drive (e.g., a virtual drive) or may be a separate physical drive or server. Further, a virtual partition or drive can comprise a portion of an existing drive or server (e.g., or multiple drives or servers), for example, where a server or drive may comprise multiple virtual partitions, which can be treated as separate drives or storage partitions. In one embodiment, data associated with a particular user of a synch system can be partitioned (e.g., virtually), such as by allocating the respective user data to one virtual drive or partition on a server (e.g., or plurality of server). When partitioned, for example, access to the partitioned data may be served by one instance of a service administering the data, such as by one server, instead of multiple servers spread over multiple geographic locations, for example, thereby providing more efficient access.

At 206, metadata that indicates a frequency of access for corresponding data may be identified to determine a first subset of data from the set of partitioned data. For example, the partitioned data comprises associated metadata, as described above, which indicates additional information about the data (e.g., frequency of access, discovery info., synch peers info., authorization/authentication info for data access, data size and/or access info., etc.). In one embodiment, the metadata that indicates frequency of access can comprise a value associated with the data that is incremented when the data is accessed and/or a value that is incremented when the data is moved. In another embodiment, the metadata that indicates frequency of access can comprise a time stamp associated with the data that indicates a time when the data is accessed and/or a time stamp that indicates a time when the data is moved.

For example, when data is accessed (e.g., changed) and/or moved an increment can be monotonically made to the metadata and/or time stamp metadata can be updated to the time the data was accessed or moved. In one embodiment, because this information can be identified, one can determine how often (e.g., and when) the data is accessed by a user of the synch system. It will be appreciated, however, that the techniques, described herein, are not limited to any particular type of metadata that identifies the frequency of access. It is envisioned that those skilled in the art may devise alternate types of metadata for identifying frequency of access, which may be utilized by one or more of the techniques and/or systems described herein to identify the frequency of access. For example, various clients and/or synch systems may utilize different means for identifying how often a file is changed or moved, such as by incrementing a value. In this example, as long as that piece of information is made available to the synch system, the frequency of access and/or age of the file may be identified, for example.

At 208, the metadata can be classified as having a high frequency of access, or not. In one embodiment, when identifying the first subset of data from the set of partitioned data, a desired frequency of access threshold may be used to classify the metadata as having a high frequency of access. In this embodiment, for example, based at least on the incrementing value and/or time stamp, the frequency of access can be compared against a threshold that indicates a "high frequency" of access. In one embodiment, the desired threshold may be determined by empirical observations of data access frequency and/or may be derived by a classifier/algorithm that is trained to identify high frequency access of data.

If the metadata is classified as having a high frequency of access (YES at 208), the "hot" metadata is stored in low latency storage, such as in an indexed database, at 210. For example, the first subset can comprise high frequency accessed data, identified by the corresponding metadata, from a set of partitioned data comprising one or more files synchronized by a service that stores the metadata. In this example, the metadata associated with the frequently accessed data is stored in the low latency storage, such that it is faster to retrieve when accessed. Typically, the metadata associated with the first subset (frequently accessed) comprises a small percentage of all the metadata associated with the set of partitioned data, for example, particularly when the synced data scales upward as the data ages (e.g., and/or has many changes). In this way, for example, merely a small amount of metadata can be stored in the more expensive, low latency storage.

If the metadata is classified as not having a high frequency of access (NO at 208), the "cold" metadata can be stored in high latency storage, such as in blob storage, at 212. For example, the metadata associated with data that is not in the first subset of the set of partitioned data (e.g., not frequently accessed) can be stored in high latency storage, such as blob or block storage. For example, higher latency storage may be less expensive (e.g., computationally) to utilize and/or manage. As an example, a type of data warehouse may be utilized to store "cold" metadata, in contrast to a highly indexed database (e.g., SQL database) that may be used to store the "hot" metadata. In this example, managing a data warehouse is computationally less expensive than a highly indexed database, particularly when storing larger amounts metadata when a synch system's scale increases.

In one aspect, the partitioned data may be classified into more than two categories, such as high frequency, medium frequency, and low frequency of access (e.g., "hot", "medium", and "cold"). In one embodiment, a second subset of the partitioned data set can be identified, where the second subset comprises data that is less frequently accessed than the data in the first subset. In this embodiment, the identification of the second set can be based, at least in part, upon the metadata associated with the less frequently accessed data. Further, as an example, the first and second subsets may comprise a portion of the set of partitioned data, with the data outside the first and second set having a lower frequency of access than the data in the first and second set. In this example, the partitioned set of data can comprise three subsets; however, the partitioned data may also be broken down into additional subsets, respectively identified by a frequency of access range.

Additionally, in this embodiment, the metadata associated with the data in the second subset can be stored in a higher latency storage than that of the metadata associated with data from the first subset (e.g., but a lower latency than the metadata associated with data outside of both the first and second sets). As an example, the metadata storage for the partitioned data may comprise three levels, a low latency storage, medium latency storage, and high latency storage. In this example, the low latency storage may comprise merely metadata that meets a high frequency of access threshold, the medium latency storage can comprise metadata that meets a range of frequency of access between the high frequency of access threshold and a lower frequency of access threshold, while the remaining metadata from the set can be stored in the high latency storage.

Figure 3:
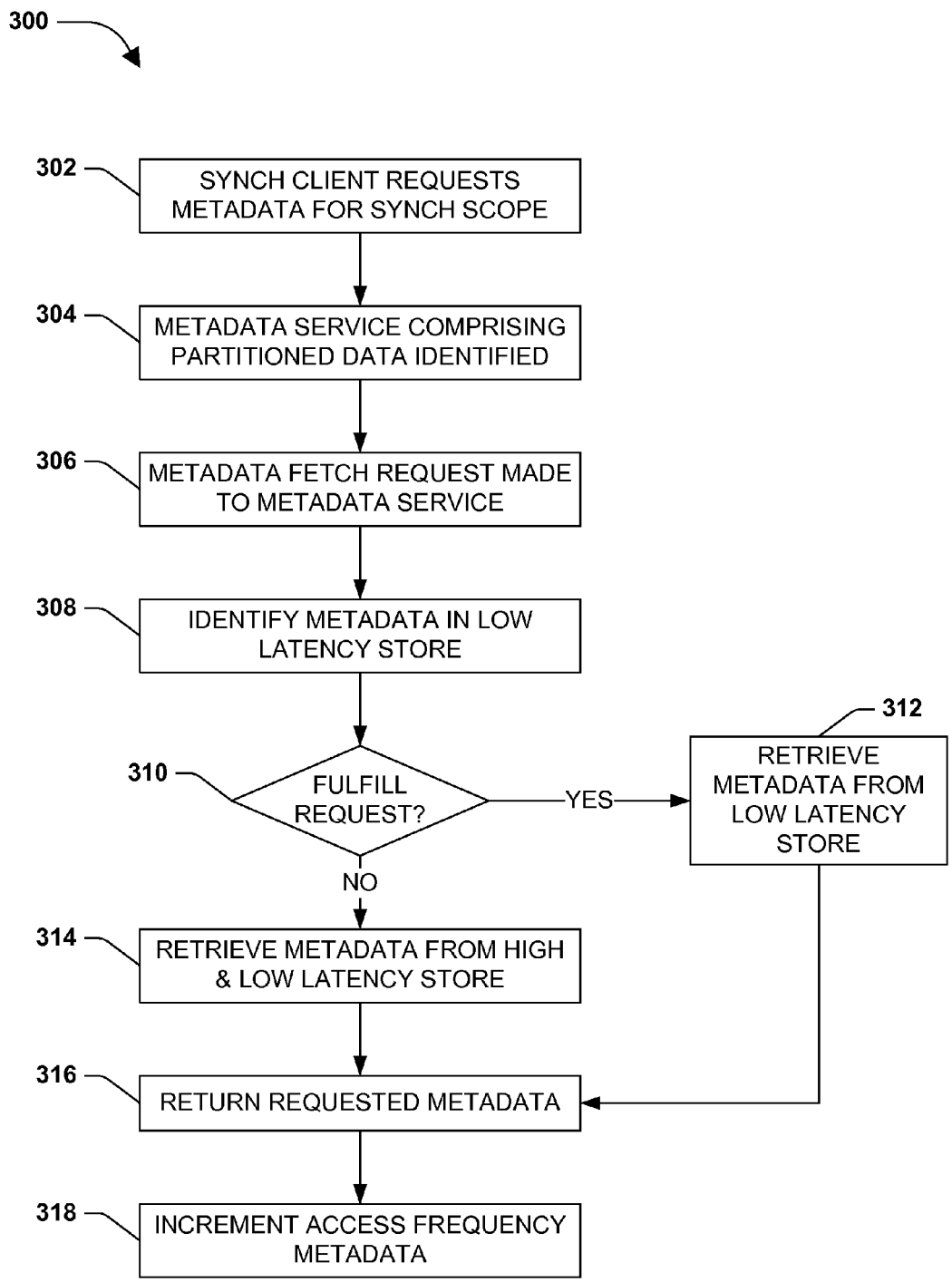
FIG. 3 is a flow diagram illustrating an example embodiment of one or more portions of one or more techniques described herein.

FIG. 3 is a flow diagram illustrating an example embodiment 300 of one or more portions of one or more techniques described herein. At 302, a client that is sharing data (e.g., files and/or folders, etc) with one or more other synch partners (e.g., using a synch service), requests metadata for a synch scope. As an example, the client may log onto a synch service to access one or more files that are synched with other synch partners. When the client logs onto the synch service, for example, one or more files may need to be synched with the client and a synch scope can be identified by the service. The request can be made to retrieve metadata associated with the one or more files in the synch scope, such as to identify permissions and/or a version of a file.

At 304, a metadata service that manages partitioned data for the requesting client can be identified. For example, the synch service may comprise a plurality of servers and/or groups of servers used to store and manage the metadata for the synch service. In one embodiment, the synch service may comprise two layers of servers, a front end server service that receives and processes requests, and a back end server service that stores metadata. In this embodiment, for example, a front end server may be served by a plurality of back end servers, where the front end server manages retrieval and/or storage of metadata stored by one or more back end servers. Further, in this embodiment, metadata associated with the partitioned data for the requesting client can be managed by a front end server service, for example, from the synch service, which may be serviced by the identified metadata service (e.g., metadata server).

At 306, a metadata fetch request is made to the identified metadata service, for the metadata from the synch scope. The metadata service can attempt to locate the requested metadata in the low latency storage, at 308. If the request can be fulfilled from the low latency storage (YES at 310), the requested metadata can be retrieved from the low latency storage, at 312. Sometimes, merely a portion of the requested metadata may be located in the low latency storage, or none of the requested metadata may be located in the low latency storage, for example.

If the request for the metadata is not fulfilled from the low latency storage (NO at 310) the requested metadata can be retrieved from both the high latency storage and the low latency storage, or merely the high latency storage, at 314. For example, the metadata associated with recently and/or frequently accessed data may be "hot," inasmuch as it may be requested by a synch client more often and/or recently. The "hot" metadata can be retrieved for the request from the low latency storage. However, in this example, if the request merely (e.g., or also) indicates "cold" metadata, such as for data that has not been accessed in a while, the "cold" metadata may need to be retrieved from the higher latency storage. Further, in one embodiment, both (e.g., or either) the "hot" and "cold" metadata can be presented to the synch service for returning to the requesting client, for example.

At 316 in the example embodiment 300, the requested metadata can be returned to the requesting client (e.g., via the synch service). At 318, the access frequency can be incremented for the metadata, as a result of the request for the metadata from the client (e.g., to move and/or change the associated data). For example, incrementing the access frequency metadata can comprise incrementing a value used to indicate that the associated data has been accessed and/or applying a time stamp indicating a time the data was accessed.

Figure 4:
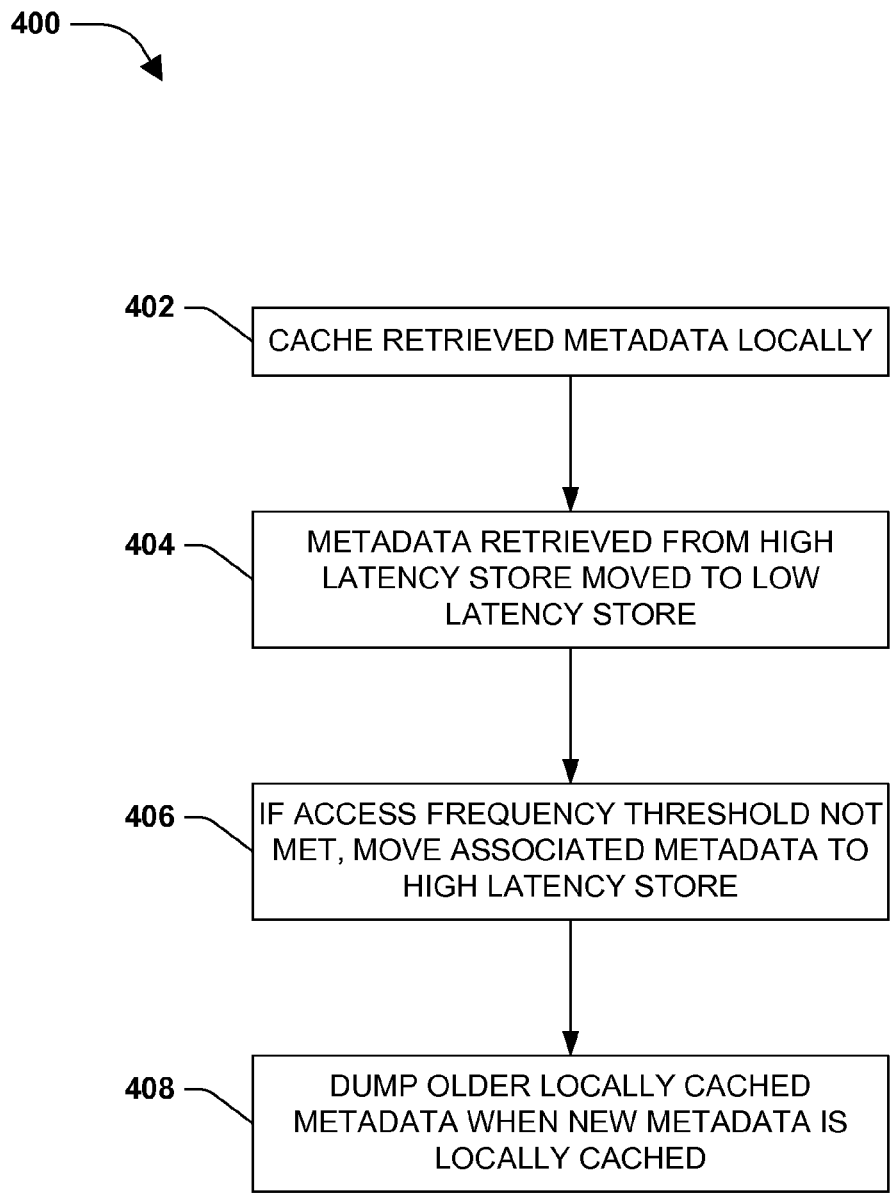
FIG. 4 is a flow diagram illustrating an example embodiment of one or more portions of one or more techniques described herein.

FIG. 4 is a flow diagram illustrating an example embodiment 400 of one or more portions of one or more techniques described herein. At 402, retrieved metadata can be cached locally. In one embodiment, the retrieved metadata may be stored in local memory, such as in memory of a metadata layer service coupled with low latency and/or higher latency storage. For example, an image of the retrieved metadata may be cached locally by the metadata layer service, which may reside between a synch service and metadata storage to manage storage and/or retrieval of metadata for the synch service.

Metadata that has been recently accessed (e.g., due to changes made to a shared file) is typically requested by another synch client shortly after, for example, due to the shared nature of the synch data. In this embodiment, by storing the retrieved metadata in local memory, when another client requests the locally stored metadata, for example, the requested metadata may be retrieved faster due to the speed and accessibility of the local cache.

At 404, metadata that is retrieved from higher latency storage can be moved to low latency storage. In one embodiment, if frequency of access indicator metadata, corresponding to synched data, meets a desired frequency of access threshold, at least some of the metadata stored in the higher latency storage can be moved to a lower latency storage. For example, after the access frequency metadata is incremented, the associated metadata can be moved to low latency storage to provide more efficient retrieval when it is subsequently accessed (e.g., by another synch client).

In another embodiment, merely retrieving the metadata may result in moving the retrieved metadata from the high latency storage to the low latency storage. For example, when metadata is retrieved, the retrieved metadata may meet the desired threshold for frequency of access, thereby allowing it to be stored in the low latency storage. When a synch client retrieves the metadata, for example, it may be an indication that the metadata is "hot", and may be subsequently accessed by other synch clients.

At 406, if the frequency of access metadata for the data does not meet a desired frequency of access threshold, the metadata associated with the data, stored in the lower latency storage, can be moved to the higher latency storage. That is, for example, synch data can become "stale" when a newer version of the data becomes available (e.g., updated version), as synch clients will typically not need to access older versions of the data. In this example, the frequency of access metadata may indicate that the data is no longer "hot," based on some threshold of access frequency (e.g., including time of last access), in which case the associated metadata can be moved to higher latency storage to facilitate efficient use of (more expensive) low latency storage.

At 408, older, locally cached metadata can be dumped (e.g., removed from memory) when newer metadata is locally cached. For example, older, locally cached (e.g., in local memory of the metadata layer service) metadata may comprise data that was previously retrieved from either (e.g., or both) low and high latency storage for a metadata request. In this example, when a new metadata request is received, and metadata is retrieved for the request, the newly retrieved metadata may be stored in the local cache, and the older metadata may be removed (e.g., or overwritten). In one embodiment, the local cache may merely remove older data when a local memory threshold is met for stored metadata. That is, for example, the local memory may comprise a metadata storage threshold of fifty percent, which can result in the oldest metadata being overwritten when newly retrieved metadata causes fifty percent (or more) of the storage capability of the local memory to be exceed.

A system may be devised that manages storage and/or retrieval of metadata associated with partitioned and/or synch data (e.g., data shared by one or more clients that is synchronized by a synch service). Synch data that is more frequently accessed may be associated with "hot" metadata, which can be stored in low latency storage for faster and more efficient retrieval, for example. Further, synch data that is less frequently accessed may be associated with "cold" metadata, which can be stored in higher latency storage for more cost effective storage, for example. Additionally, the stored metadata may be transitioned between various high and low latency stores based on how often (e.g., and/or how recently) the metadata is accessed by a request from a synch client. In this way, for example, merely a portion of the metadata for shared data may be stored in more expensive (e.g., computationally) low latency storage, while a bulk of the metadata can be stored in less expensive, high latency storage.

Figure 5:
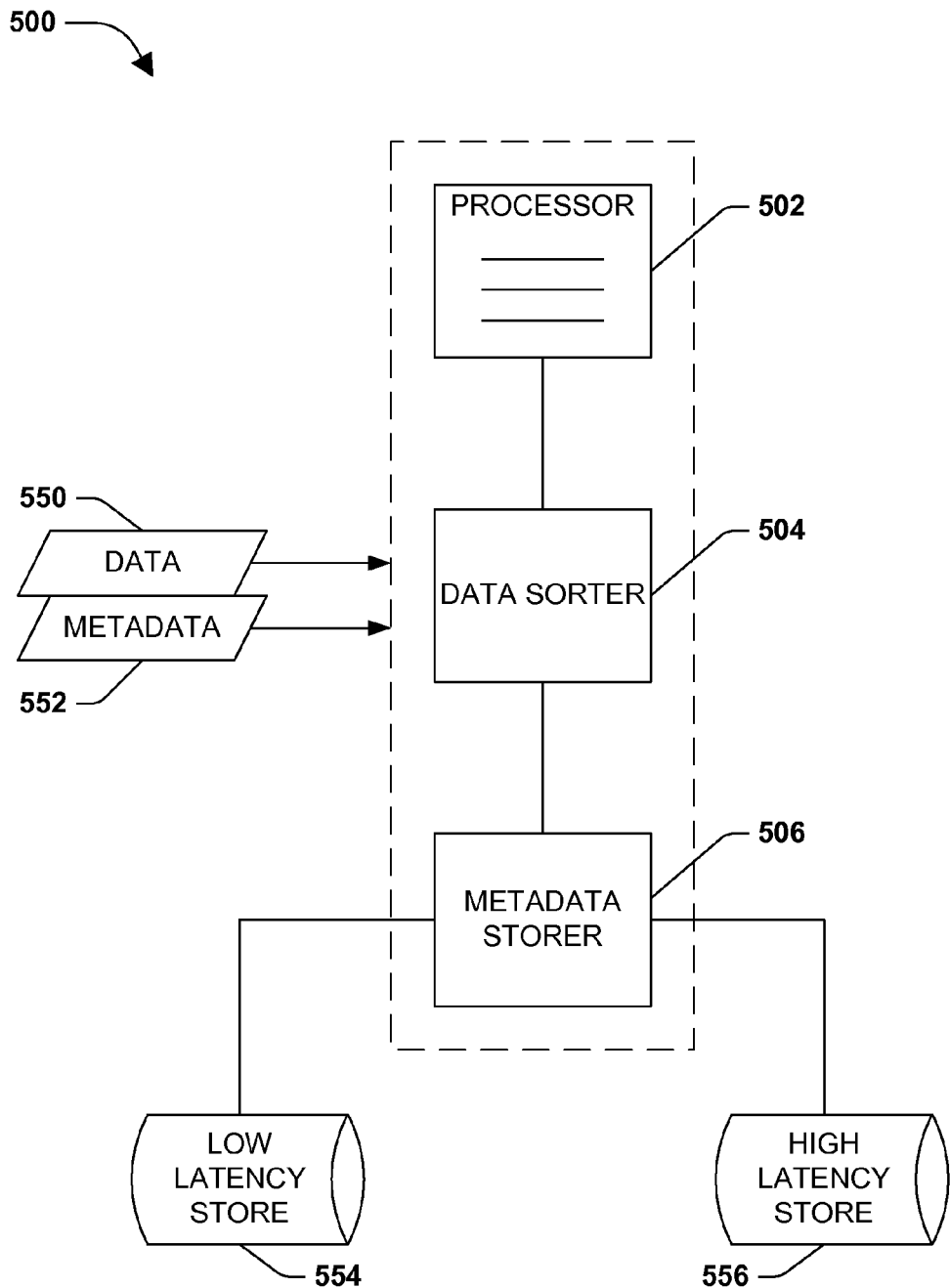
FIG. 5 is a component diagram illustrating an exemplary system for efficiently storing metadata of partitioned data.

FIG. 5 is a component diagram illustrating an exemplary system 500 for efficiently storing metadata of partitioned data. A computer based processor 502 is configured to process data for the system 500, and the processor 502 is operably coupled with a data sorting component 504. The data sorting component 504 is configured to identify a first subset, comprising high frequency accessed data, from a set of partitioned data 550. The data sorting component 504 uses, at least in part, metadata 552 that is associated with the data 550 in the set to identify the first subset.

In one embodiment, the metadata associated with the data in the set, used to identify the first subset, can comprise a monotonically incrementing value that is configured to indicate a data access and/or data move, instance. For example, the value may be incremented when the associated data is accessed, such as to be changed, edited, etc. In this example, the value can indicate how often the associated data has been accessed and/or moved, thereby providing an indication of frequency of access (e.g., whether the data is "hot").

In one embodiment, the metadata associated with the data in the set, used to identify the first subset, can comprise a time stamp configured to indicate a data access and/or move, instance. For example, when the data associated with the metadata is accessed and/or moved a time stamp may be created that indicates a time (e.g., and/or date) of access. In this way, for example, the time stamp metadata may indicate a last time the associated data was accessed, which provides an indication of whether or not the associated data is "hot" (e.g., are synch clients still interested in accessing this data).

In the exemplary system 500, a metadata storing component 506 is operably coupled with the data sorting component 504. The metadata storing component 506 is configured to store the metadata associated with the data in the first subset in low latency storage 554, and store metadata associated with data from the set that is outside the first subset in higher latency storage 556. For example, because the data in the first subset may be more frequently accessed than the other data in the set, the associated metadata may also be more frequently retrieved by a synch client, such as for a synch request. In this example, storing the frequently accessed metadata in the low latency storage 554 may provide for more efficient retrieval, particularly because the data may be frequently requested.

Further, the metadata associated with the less frequently accessed data may also be less frequently accessed by a requesting synch client, for example. Because the metadata is less frequently accessed, as an example, it may be stored in a higher latency storage 556, which may be less computationally (e.g., and cost) expensive to maintain than the low latency storage 554. Typically, for example, a bulk of the metadata associated with synch data is less frequently accessed (e.g., outside the first subset). Therefore, in this example, a bulk of the metadata can be stored in less expensive, higher latency storage 556.

Figure 6:
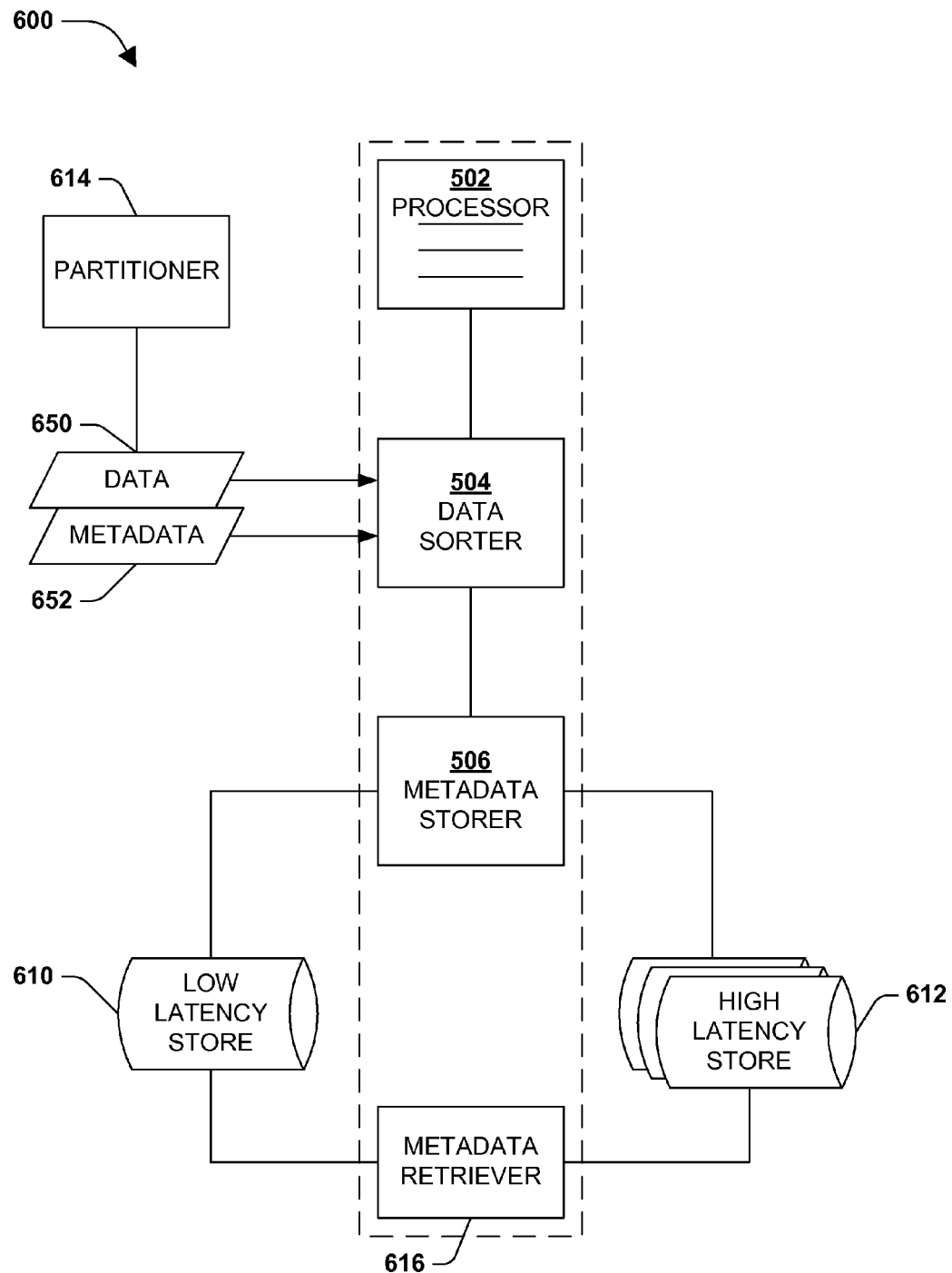
FIG. 6 is a component diagram illustrating an example embodiment where one or more systems described herein may be implemented.

FIG. 6 is a component diagram illustrating an example embodiment 600 where one or more systems described herein may be implemented. In this example, an extension of FIG. 5 is provided and thus description of elements, components, etc. described with respect to FIG. 5 may not be repeated for simplicity. A low latency storage component 610 is configured to store metadata for low latency retrieval. A higher latency storage component 612 is configured to store metadata for higher latency retrieval. In one embodiment, the low latency storage component 610 may comprise an indexed database, such as a SQL database, for example. While an indexed database may be more computationally expensive to operate and maintain, the data stored therein may be more efficiently (e.g., faster) stored and/or retrieved.

In one embodiment, the higher latency storage component 612 may comprise binary (e.g., or basic) large object (blob) storage (e.g., or some other block type storage). For example, blob storage can be computationally less expensive to operate and maintain, as merely large blocks of data are stored and maintained for a set of partitioned data. In one embodiment, the higher latency storage component 612 can comprise more than one level of storage, for example, respectively comprising different levels of latency (e.g., and computational cost).

In this embodiment, the higher latency storage component 612 can comprise a first higher latency storage component configured to store metadata for a first latency retrieval level, and a second higher latency storage component configured to store metadata for a second latency retrieval level. For example, depending on the frequency of access for data from a corresponding set of partitioned data, the associated metadata may be stored at different latency levels.

As an example, for data that was accessed last week, the associated metadata may be stored in the first higher latency storage (e.g., which has a higher latency than the low latency store); and for data that was accessed last month, the associated metadata may be stored in the second higher latency storage (e.g., which has a higher latency than the first higher latency storage). In this way, for example, the least frequently accessed metadata (e.g., which typically comprises most of the synch metadata, especially when the synch system increases in scale) can be stored in a less expensive, higher latency storage.

In the example embodiment 600, a partitioning component 614 can be configured to group data for a user into a same set of partitioned data 650. For example, data that is accessed by a user (e.g., or one synch client) can be partitioned into a partition that is merely associated with that user. In this way, for example, when the partitioned data is stored, it may be stored as a set of partitioned data, which may allow for more efficient retrieval.

Further, the partitioning component 614 can be configured to identify a metadata management component (not illustrated) that is associated with the user for the partitioned data. As an example, data associated with a particular user of a synch system can be partitioned (e.g., virtually), such as by allocating the partitioned data 650, and associated metadata 652, to one virtual drive or partition on a server (e.g., or plurality of servers). When partitioned, for example, access to the partitioned metadata 650 may be served by the metadata management component that is associated with the user, which can provide access to the metadata upon request(s).

Additionally, a metadata retrieval component 616 can be configured to retrieve metadata corresponding to a request from the low latency storage if the metadata is stored in the low latency storage 610, and retrieve the requested metadata from the higher latency storage 612 if the metadata not found in the low latency storage 610. For example, upon receiving a request for metadata (e.g., for a data synch), the metadata retrieval component 616 may attempt to find the requested metadata in the low latency storage 610, where some, all, or none or the requested metadata may be found. If at least some (or all) of the requested metadata is not found in the low latency storage 610, for example, the metadata retrieval component 616 can attempt to retrieve the (remaining) metadata from the higher latency storage 612.

Further, the metadata retrieval component 616 can be configured to store an image in a metadata layer (e.g., metadata management component (not illustrated)), where the image comprises at least some of the metadata associated with data in a first subset (e.g., frequently accessed data) and at least some of the metadata associated with data from a set not in the first subset (e.g., less frequently accessed data). For example, the metadata retrieval component 616 may comprise (e.g., may be coupled with) local memory, in which an image (e.g., copy) of retrieved metadata can be cached. As an example, the retrieved metadata may comprise frequently accessed metadata, retrieved from the low latency storage 610, and less frequently accessed metadata from the high latency storage. In this example, the retrieved metadata can be stored locally in memory, such that a subsequent request for some or all of the locally cached metadata may be quickly fulfilled.

In the example embodiment 600, the metadata retrieval component 616 can be configured to move metadata stored in higher latency storage to lower latency storage, based upon frequency of access, for example. For example, if a desired level of access frequency is met by the synch system (e.g., data has been recently access/moved, or is accessed a number of times to meet the threshold), the associated metadata can be moved to the low latency storage 610 from the high latency store 612. Similarly, metadata can be moved from the low latency storage to the high latency storage based upon (in) frequency of access (e.g., when data and/or metadata becomes stale, is not accessed for a period of time, etc.).

Figure 7:
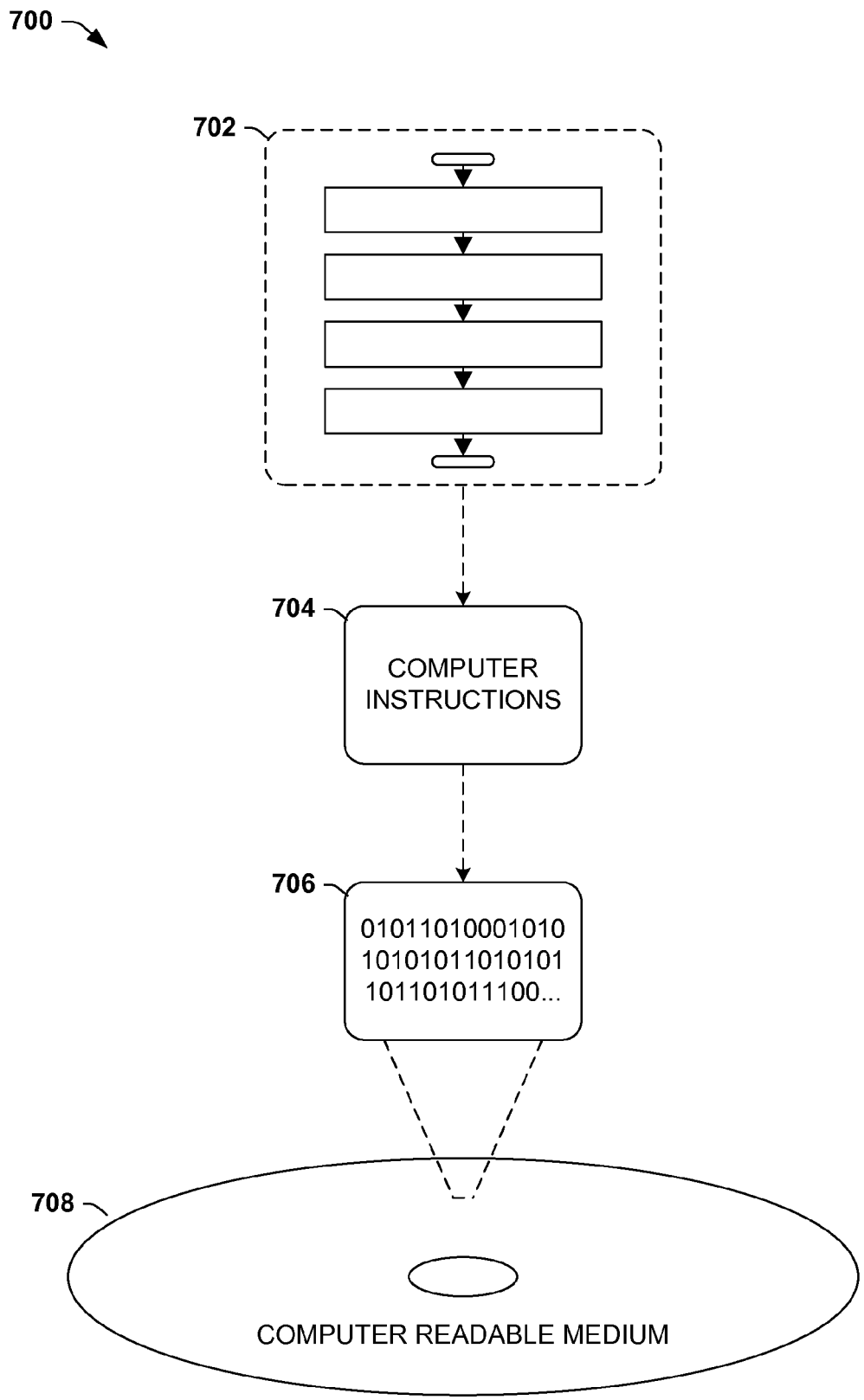
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
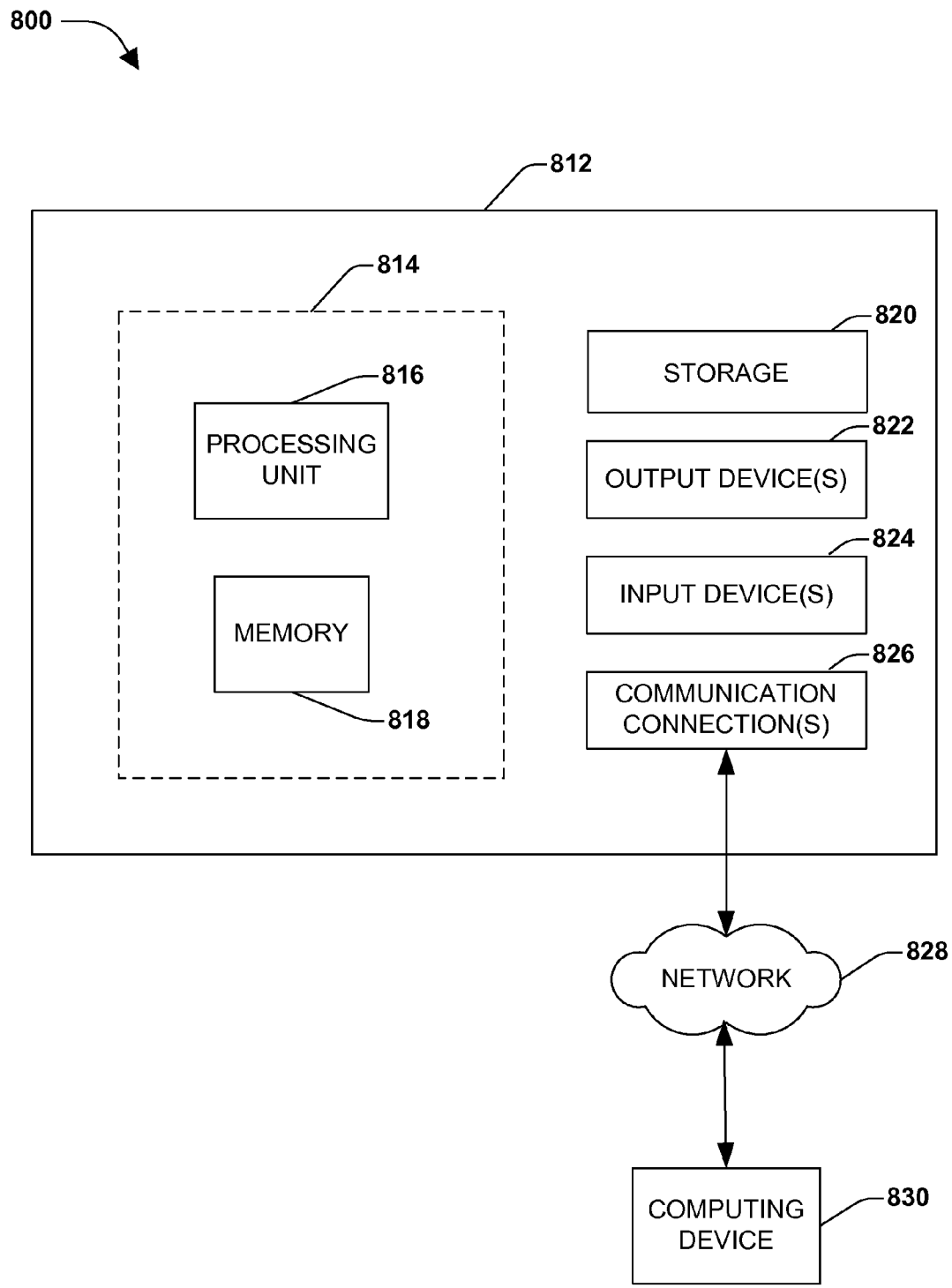
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for efficiently storing metadata, comprising:
   identifying, from a set of data, a first subset of data comprising data that has a high frequency of access;
   storing first metadata associated with the first subset in low latency storage based upon the first subset comprising the data that has the high frequency of access, the first metadata comprising file synchronization system metadata configured to facilitate synchronization of at least some of the first subset; and
   storing second metadata associated with data from the set outside the first subset in higher latency storage based upon the data from the set outside the first subset comprising data that does not have the high frequency of access.

2. The method of claim 1, identifying the first subset comprising identifying metadata that indicates a frequency of access.

3. The method of claim 2, identifying metadata that indicates a frequency of access comprising identifying one or more of:
   a first value that is incremented when first data is accessed;
   a second value that is incremented when second data is moved;
   a first time stamp that indicates a first time when third data is moved; or
   a second time stamp that indicates a second time when fourth data is accessed.

4. The method of claim 1, identifying the first subset comprising identifying metadata that meets a desired frequency of access threshold.

5. The method of claim 1, the set comprising one or more files.

6. The method of claim 1, the set comprising data partitioned for a user.

7. The method of claim 1, comprising:
   identifying a second subset of data that has a lower frequency of access relative to the first subset; and
   storing metadata associated with the second subset in the higher latency storage.

8. The method of claim 1, comprising:
   upon receiving a request for metadata,
      identifying if the requested metadata is stored in the low latency storage;
      retrieving at least a portion of the requested metadata from the low latency storage if identified; and
      retrieving at least a portion of the requested metadata from the higher latency storage if not identified in the low latency storage.

9. The method of claim 8, comprising storing an image of at least some of the retrieved metadata in a metadata layer coupled with at least one of the low latency storage or the higher latency storage.

10. The method of claim 1, comprising moving at least some metadata stored in the higher latency storage to a lower latency storage if a frequency of access indicator meets a desired frequency of access threshold.

11. The method of claim 1, comprising
   moving at least some metadata stored in lower latency storage to the higher latency storage if frequency of access metadata for the metadata does not meet a desired frequency of access threshold.

12. A system for efficiently storing metadata, comprising:
a computer-based processor configured to process data for the system;
a data sorting component configured to identify, from a set of data, a first subset of data comprising data that has a high frequency of access; and
a metadata storing component configured to:
store first metadata associated with the first subset in low latency storage based upon the first subset comprising the data that has the high frequency of access, the first metadata comprising file synchronization system metadata configured to facilitate synchronization of at least some of the first subset; and
store second metadata associated with data from the set not in the first subset in higher latency storage based upon the data from the set outside the first subset comprising data that does not have the high frequency of access.

13. The system of claim 12, comprising one or more of:
a low latency storage component configured to store the first metadata for low latency retrieval; or
a higher latency storage component configured to store the second metadata for higher latency retrieval.

14. The system of claim 13, the higher latency storage component comprising:
a first higher latency storage component configured to store a first portion of the second metadata for a first level of higher latency retrieval; and
a second higher latency storage component configured to store a second portion of the second metadata for a second level of higher latency retrieval.

15. The system of claim 12, comprising a partitioning component configured to group data for a user into a same set of partitioned data.

16. The system of claim 12, at least one of:
the low latency storage comprising an indexed database; or
the higher latency storage comprising binary large object storage.

17. The system of claim 12, at least one of the first metadata or the second metadata associated with one or more of:
a first monotonically incrementing value indicating first data access;
a second monotonically incrementing value indicating second data movement;
a first time stamp indicating third data access; or
a second time stamp indicating fourth data movement.

18. The system of claim 12, comprising a metadata retrieval component configured to perform one or more of:
move at least some of the second metadata to a lower latency storage if frequency of access metadata meets a desired frequency of access threshold;
store an image of at least some of at least one of the first metadata or the second metadata in a metadata layer; or
retrieve requested metadata from the low latency storage if the requested metadata is stored in the low latency storage, else retrieve the requested metadata from the higher latency storage.

19. The system of claim 12, the set of data associated with a user.

20. A tangible computer readable medium comprising instructions that when executed via a processing unit perform a method for efficiently storing metadata, comprising:
identifying, from a set of data, a first subset of data comprising data that has a high frequency of access;
storing first metadata associated with the first subset in low latency storage based upon the first subset comprising the data that has the high frequency of access, the first metadata comprising file synchronization system metadata; and
storing second metadata associated with data from the set outside the first subset in higher latency storage based upon the data from the set outside the first subset comprising data that does not have the high frequency of access.

* * * * *